US012484593B2

(12) United States Patent
Bennett et al.

(10) Patent No.: US 12,484,593 B2
(45) Date of Patent: Dec. 2, 2025

(54) VERTICAL SMOKER

(71) Applicant: LOGAN OUTDOOR PRODUCTS, LLC, Hyde Park, UT (US)

(72) Inventors: Brett Petersen Bennett, Mantua, UT (US); Ryan Tighe Anderson, Preston, ID (US); Mason Jake Larsen, Smithfield, UT (US); Max Ryan Messerli, Tremonton, UT (US)

(73) Assignee: Logan Outdoor Products, LLC, Hyde Park, UT (US)

( * ) Notice: Subject to any disclaimer, the term of this patent is extended or adjusted under 35 U.S.C. 154(b) by 586 days.

(21) Appl. No.: 17/903,713

(22) Filed: Sep. 6, 2022

(65) Prior Publication Data

US 2023/0073460 A1 Mar. 9, 2023

Related U.S. Application Data

(60) Provisional application No. 63/240,833, filed on Sep. 3, 2021.

(51) Int. Cl.
*A23B 4/052* (2006.01)
*A23B 4/044* (2006.01)
*A47J 37/06* (2006.01)

(52) U.S. Cl.
CPC ............ *A23B 4/0526* (2013.01); *A23B 4/044* (2013.01); *A23B 4/0523* (2013.01); *A47J 37/0664* (2013.01)

(58) Field of Classification Search
CPC ..... A23B 4/0526; A23B 4/0523; A23B 4/044; A23B 4/052; Y02A 40/90; A47J 37/0664; A47J 37/0718; A47J 37/0704; F24B 1/024; F24B 1/026

USPC ................................... 126/25 R; 99/482, 473
See application file for complete search history.

(56) References Cited

U.S. PATENT DOCUMENTS 3,971,308 A * 7/1976 Parker .................... A23B 4/052
99/476
4,979,436 A * 12/1990 McGowan ............. A23B 4/052
126/369
5,891,498 A * 4/1999 Boehler ................. A23B 4/052
126/41 R (Continued)

OTHER PUBLICATIONS

International Search Report and Written Opinion cited in PCT/US2022/042635 dated Dec. 16, 2022, 9 Pages.

*Primary Examiner* — Steven B McAllister
*Assistant Examiner* — Amy E Carter
(74) *Attorney, Agent, or Firm* — Reed Smith LLP; Amardeep S. Grewal (57) ABSTRACT

A vertical smoker including an external housing, one or more sidewalls at least partially defining a cooking chamber within the external housing, a solid fuel combustion unit configured to combust solid fuel and produce smoke and heat, a drip tray disposed above the solid fuel combustion unit and forming a floor of the cooking chamber, the drip tray being configured to route the smoke and heat into at least one channel disposed between at least one sidewall in the one or more sidewalls and the external housing, and one or more apertures disposed in the at least one sidewall, the one or more apertures being configured to allow the smoke and heat to pass from the at least one channel into the cooking chamber.

19 Claims, 12 Drawing Sheets

(56) References Cited

U.S. PATENT DOCUMENTS

| | | | |
|---|---|---|---|
| 7,426,885 B2* | 9/2008 | McLemore | A23B 4/052 |
| | | | 126/59.5 |
| 2005/0204934 A1* | 9/2005 | Robertson | A23L 5/15 |
| | | | 99/482 |
| 2007/0131234 A1 | 6/2007 | Moore | |
| 2015/0079250 A1 | 3/2015 | Ahmed | |
| 2017/0094984 A1* | 4/2017 | Blue | A23B 4/052 |
| 2018/0368617 A1* | 12/2018 | Allmendinger | A47J 37/0704 |
| 2019/0320669 A1* | 10/2019 | Powell | A47J 37/0629 |
| 2020/0214304 A1* | 7/2020 | Garces | A23B 4/052 |
| 2021/0169269 A1* | 6/2021 | Meadows | A23B 4/0523 |
| 2021/0259263 A1* | 8/2021 | Carballo | B01D 53/885 |

* cited by examiner

VERTICAL SMOKER

RELATED APPLICATION DATA

This application claims priority to U.S. Provisional Application No. 63/240,833 filed Sep. 3, 2021, the disclosure of which is hereby incorporated by reference in its entirety.

BACKGROUND

Smokers are cooking devices that combust solid fuels to product smoke and heat to cook food. As the combustion chamber of the smoker is typically located below the cooking area, smoke and heat generated from combustion typically rises into cooking area, resulting in foods located closer to the combustion chamber receiving more heat than higher placed foods and uneven cooking. Existing smokers do not adequately circulate the generated heat and smoke to evenly cook foods distributed throughout the cooking area. Accordingly, improvements are needed in smoker cooking devices.

SUMMARY

A vertical smoker, including an external housing, one or more sidewalls at least partially defining a cooking chamber within the external housing, a solid fuel combustion unit configured to combust solid fuel and produce smoke and heat, a drip tray disposed above the solid fuel combustion unit and forming a floor of the cooking chamber, the drip tray being configured to route the smoke and heat into at least one channel disposed between at least one sidewall in the one or more sidewalls and the external housing, and one or more apertures disposed in the at least one sidewall, the one or more apertures being configured to allow the smoke and heat to pass from the at least one channel into the cooking chamber.

The vertical smoker can include a back panel at least partially forming a back wall of the cooking chamber and can further include exhaust opening disposed within the cooking chamber below the back panel, the exhaust opening being configured to allow smoke to exit from the cooking chamber and out of the external housing.

The vertical smoker can include two sidewalls and two channels disposed between the two sidewalls and the external housing. The one or more apertures can include a plurality of apertures disposed in the two sidewalls.

The solid fuel combustion unit can include a wood pellet burner. The vertical smoker can further include a wood pellet hopper configured to store a supply of wood pellets and an auger configured to feed wood pellets to the wood pellet burner.

The drip tray can extend to the one or more sidewalls to thereby seal the bottom of the cooking chamber. The drip tray can be sloped upwards from a low point above the solid fuel combustion unit to a high point at the one or more sidewalls.

The one or more apertures can include one or more of: a circular aperture, an oval aperture, a rectangular aperture, a triangular aperture, or a slit. The one or more apertures can be disposed in an upper half of the at least one sidewall.

The cooking chamber can include one or more cooking racks. The cooking chamber can further include one or more cooking hooks.

The solid fuel combustion unit can be disposed within a lower portion of a volume defined by the external housing and outside of the cooking chamber.

The vertical smoker can further include a secondary solid fuel combustion unit removably inserted into the cooking device below the cooking chamber and configured to combust a second solid fuel and provide a second source of smoke and heat.

The secondary solid fuel combustion unit can be removably inserted into a receiving aperture integrated into the cooking device and configured to receive the secondary solid fuel combustion unit.

The vertical smoker can further include a butterfly valve disposed above the solid fuel combustion unit and below the secondary solid fuel combustion unit, the butterfly valve being actuated by a handle on the external housing. The solid fuel combustion unit can include a burner configured to combust the solid fuel. The burner can be further configured to combust the second solid fuel in the secondary solid fuel combustion unit when the butterfly valve is in the open position.

The vertical smoker can further include a housing configured to receive the secondary solid fuel combustion unit, the housing comprising a ceiling configured to seal the secondary solid fuel combustion unit when the secondary solid fuel combustion unit is completely inserted into the receiving aperture.

DETAILED DESCRIPTION

Applicant has discovered a novel vertical smoker having secondary smoke generation and a drip tray which functions as a heat shield and prevents smoke and heat from directly rising to a cooking surface within the cooking chamber by diverting the smoke and heat to the sides of the vertical smoker.

The vertical smoker includes a cooking chamber having one or more cooking racks/cooking surfaces and a solid fuel combustion unit positioned below the cooking chamber and configured to combust a first solid fuel and provide a first source of smoke. The cooking surfaces can be, for example, multiple wire racks.

The vertical smoker includes a secondary solid fuel combustion unit removably inserted into the cooking device below the cooking chamber and configured to combust a second solid fuel and provide a second source of smoke. The secondary solid fuel combustion unit can be removably inserted into a receiving aperture integrated into the cooking device and configured to receive the secondary solid fuel combustion unit. The receiving aperture can be a drawer, a tube, a hollow opening, and/or any other type of opening that is integrated into the cooking device.

The secondary solid fuel combustion unit can be a removable smoke box configured to slide into and out of an opening in the cooking device, as shown in FIGS. 1-12. The secondary solid fuel combustion unit can also take other forms, such as an integrated smoke tube configured to slide into and out of an opening in the cooking device. Although not illustrated, it is understood that an integrated smoke tube can be utilized with the smoker shown in FIGS. 1-11.

FIGS. 1-12 illustrate a vertical smoker according to an exemplary embodiment. The vertical smoker 100 that includes a pellet hopper 102 which feeds pellets to first solid fuel combustion unit 105 within the smoker 100 via tube 106 and provides a first source of smoke. The smoker 100 can additionally optionally also include a secondary solid fuel combustion unit in the form of a removable smoke box 101 that is configured to slide into and out of an opening in the smoker/cooking device. The smoke box 101 is removably inserted into the cooking device below a cooking chamber within the smoker and configured to combust a second solid fuel and provide a second source of smoke.

The integrated smoke box 101 allows a user to add charcoal, wood chunks, and/or pellets to the smoker 100 to add additional smoke flavor. When using charcoal or wood chunks, this can add more of a traditional smoke flavor to the pellet smoke generated from the combustion of wood pellets by the primary burner 105.

The integrated smoke box 101 can be opened slightly to allow more air flow so that the solid fuel (e.g., the charcoal or wood) smokes more. Additionally, handle 103 is used to rotate a disc 104 over the burner 105 to allow the direct flame from the pellet burner 05 to ignite the wood or charcoal in the box. The disc 104 is a butterfly valve that lets heat and air up in the smoke box container 101B from the burner cup of the burner 105 to start the solid fuel within the smoke box 101B smoking. The handle 103 is typically opened to ignite and then closed. The handle 101A of the integrated smoke box 101 has a gasket attached to seal the chamber so that smoke will go up into the chamber. There is also a gap 101D between the gasket and the handle 101A that improves the air flow of the smoke box.

Figure 1:
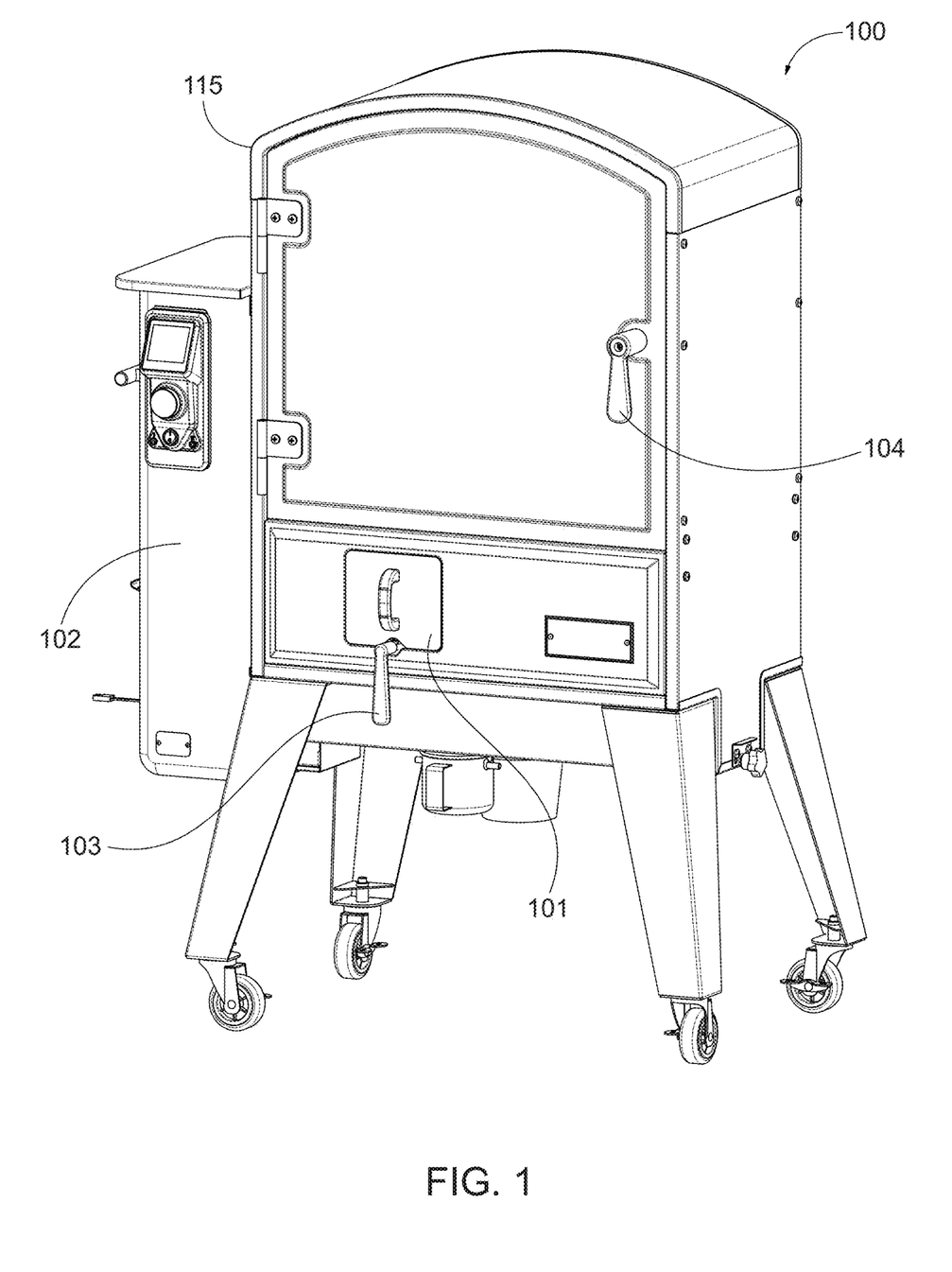
FIG. 1 illustrates a vertical smoker according to an exemplary embodiment.
Figure 2:
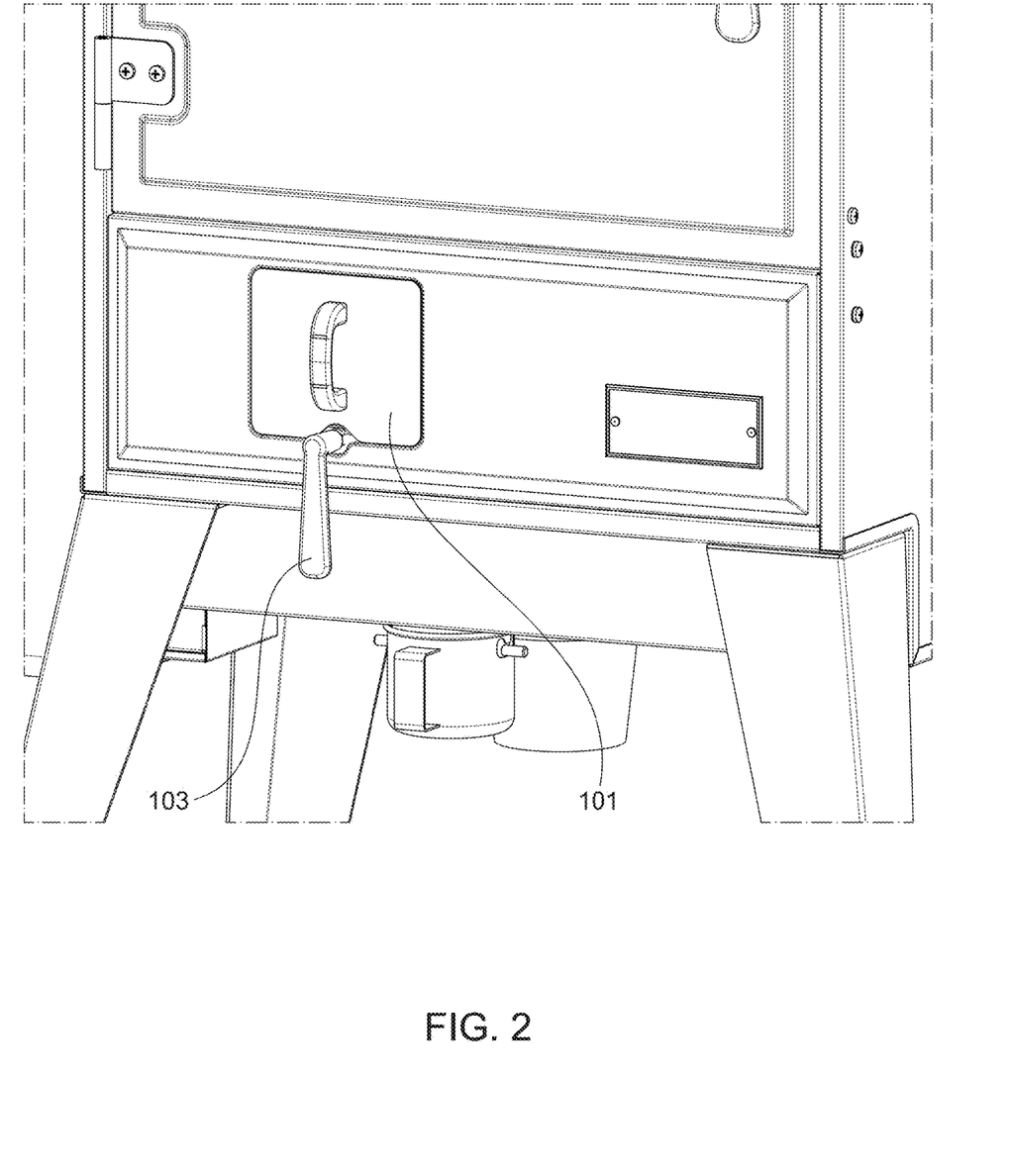
FIGS. 2-5 illustrate the secondary solid fuel combustion unit of the vertical smoker according to an exemplary embodiment.
Figure 3:
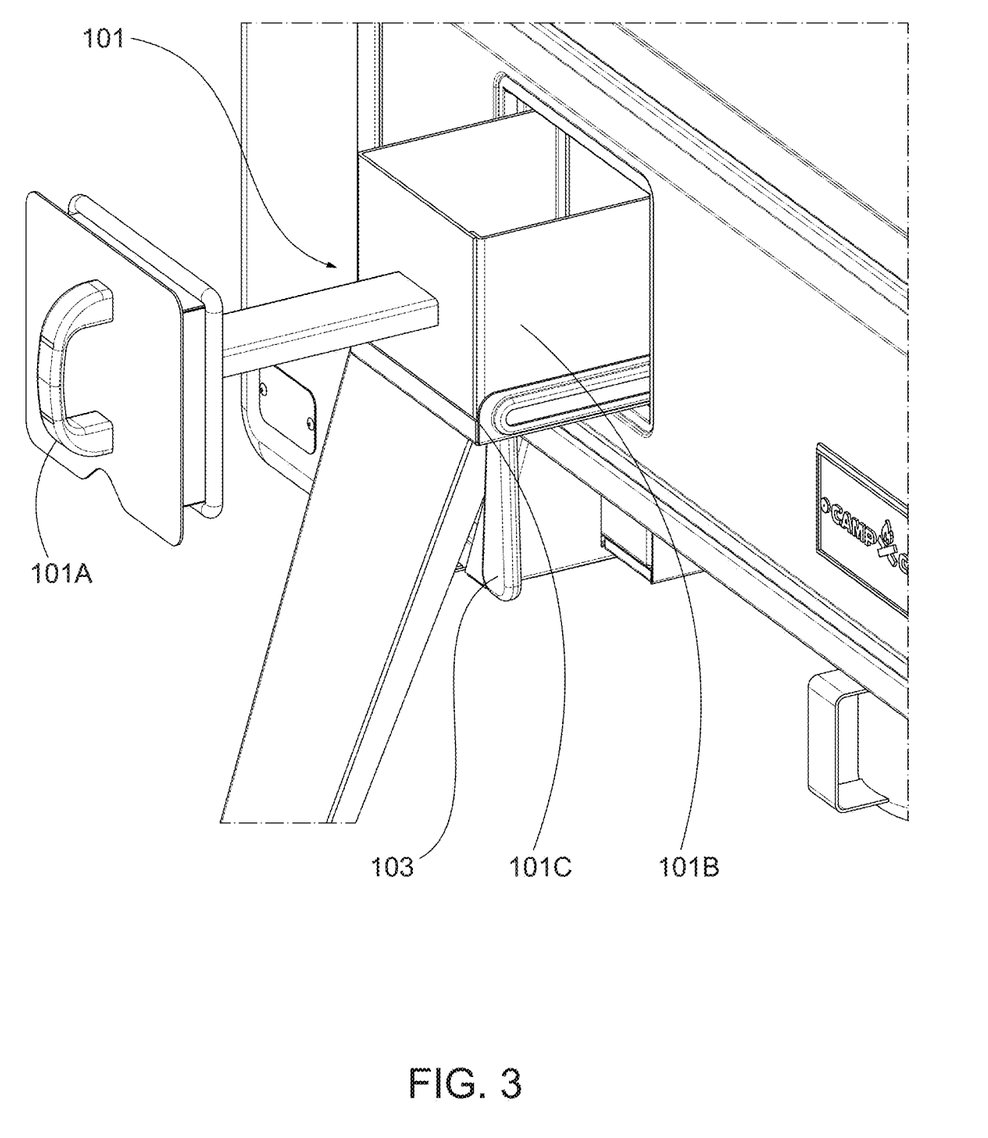
Figure 4:
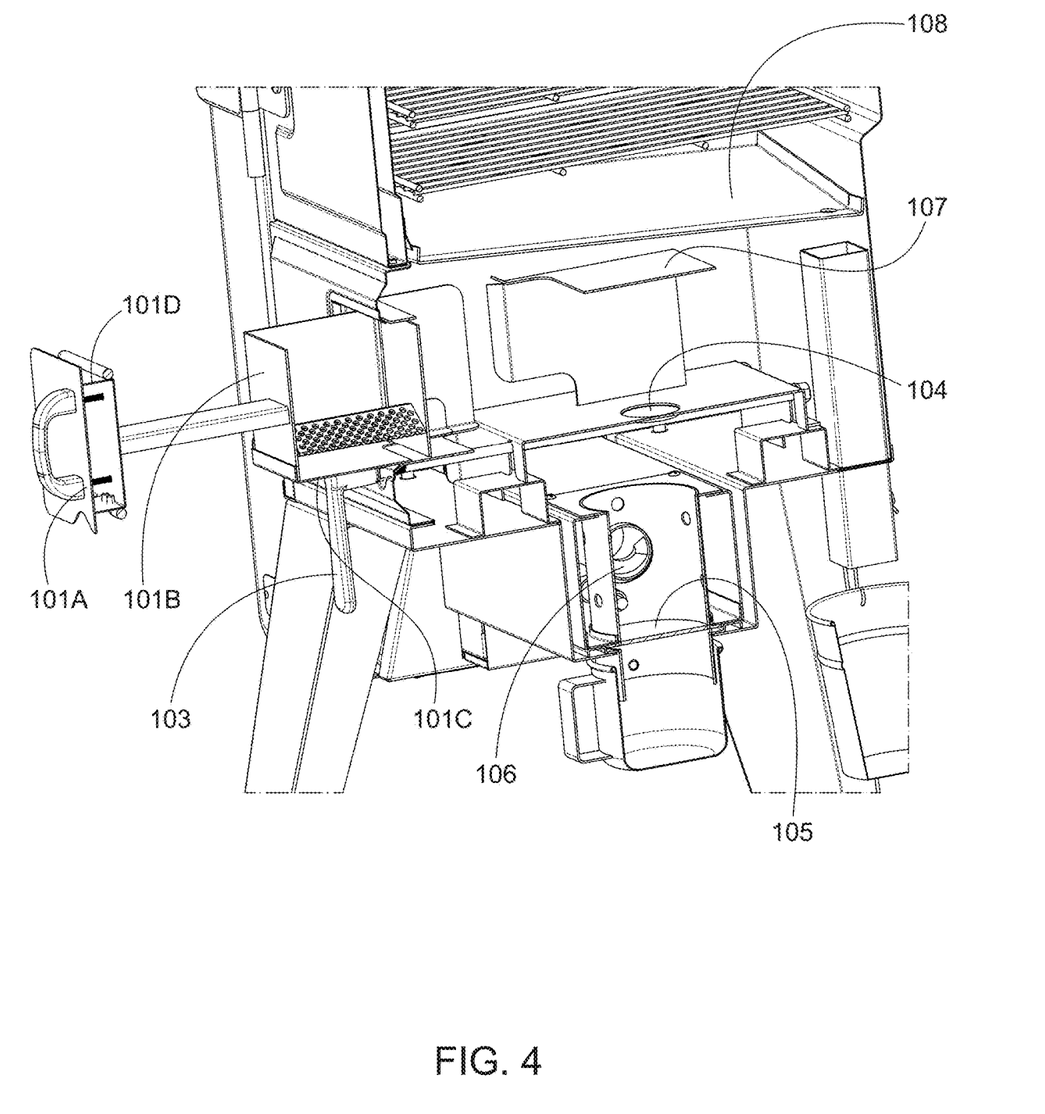
Figure 5:
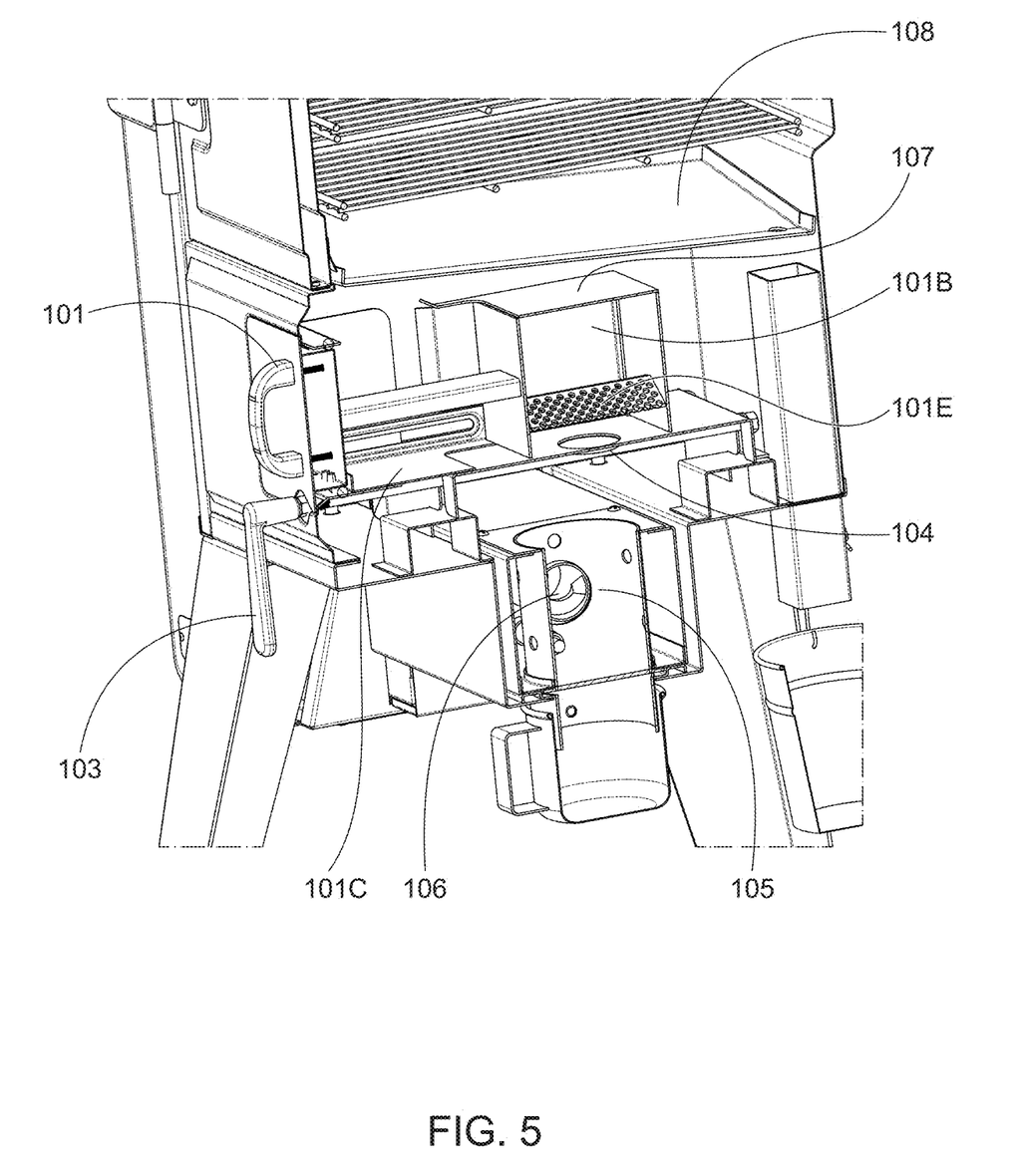
Figure 6:
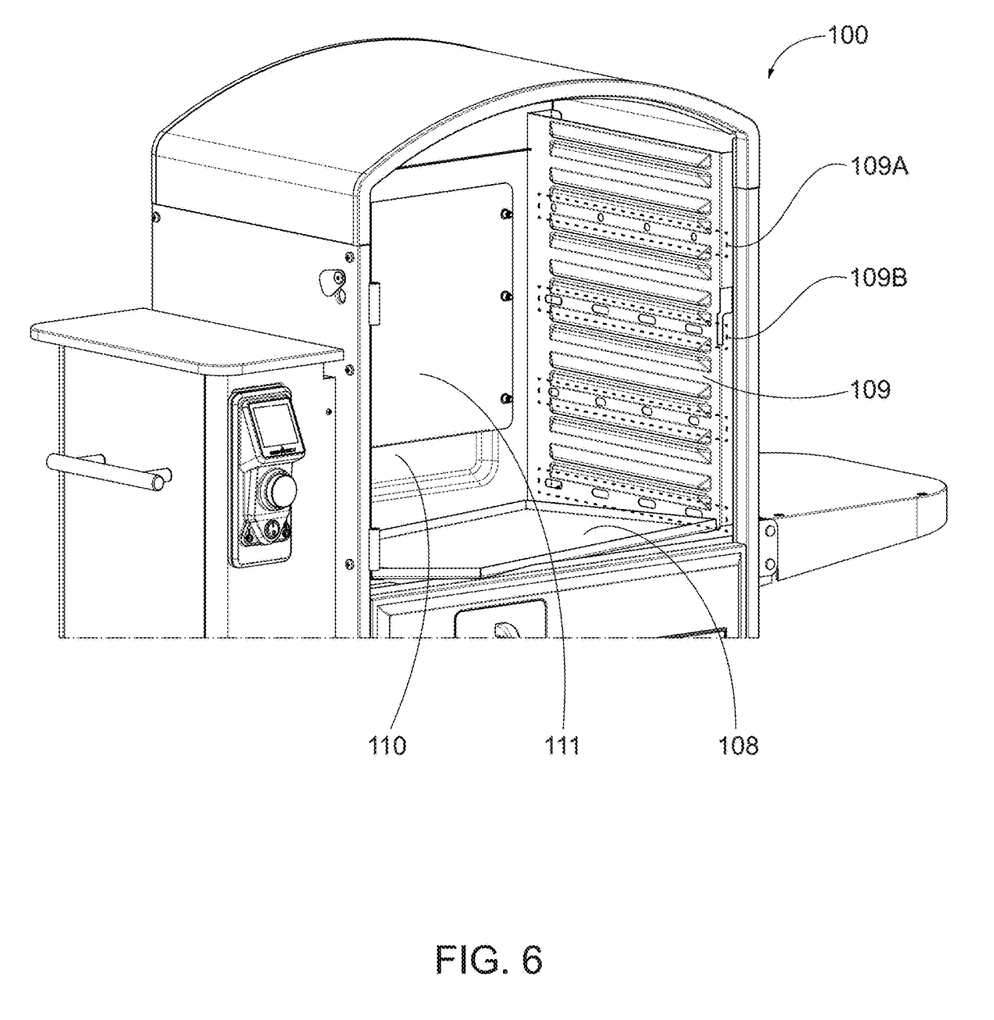
FIGS. 6-7 illustrate sidewalls of the cooking chamber and apertures in a sidewall of the cooking chamber of the vertical smoker according to an exemplary embodiment.

The secondary solid fuel combustion unit/integrated smoke box 101 includes a handle 101A and a smoke box 101B that actually holds the combustible solid fuel. There is a box support 101C underneath the smoke box 101B that ensures that ash will not fall on the ground when changing the smoke box 101B. As shown in FIGS. 4-5, the box support 101C supports the smoke box 101B when the smoke box 101B is pulled out but not when the smoke box is completely inserted, thereby allowing the opened disc 104 to be used to ignite the solid fuel in the smoke box 101B.

Also shown in FIGS. 4-5 is a ceiling/housing 107 for the smoke box 101B (which does not have a ceiling). The housing 107 for the smoke box 101B allows for controlling flame from the burner and airflow while in use. When the smoke box 101B is slid completely in, the housing 107 seals the top of the smoke box 101B so that it will not smoke as much. The smoke box 101B can be slid out a little to allow more air flow.

Smoke box 101B includes a perforated screen 101E that holds the solid fuel, such as wood or charcoal. It will continuously smolder and provide a second smoke source in addition to the smoke produced by the pellets of the smoker.

As shown in FIGS. 6-12, the vertical smoker 100 also includes a drip tray 108 configured to catch liquids and grease from foods cooking on the cooking racks within the cooking chamber.

FIGS. 6-12 illustrate various components of the internal cooking chamber of the vertical smoker according to an exemplary embodiment. Right sidewall 109 and left sidewall 112 of the cooking chamber are offset from the internal right wall and internal left wall of the vertical smoker, such that a gap exists between the right cooking chamber sidewall 109 and internal right wall of the smoker and left cooking chamber sidewall 112 and the internal left wall of the smoker.

The drip tray 108 is configured to extend from right sidewall 109 to the left sidewall 112 of the cooking chamber and to further extend from the front wall to the back wall of the cooking chamber to thereby route smoke and heat from both the primary combustion unit (e.g., the pellet burner) and the secondary combustion unit (e.g., the smoker box) into the gap between the right cooking chamber sidewall 109 and internal right wall of the smoker and left cooking chamber sidewall 112 and the internal left wall of the smoker.

The drip tray 108 is dimensioned and positioned to route smoke and hot air produced by the primary and secondary solid fuel combustion unit to the sides of the smoker. The drip tray 108 is specifically configured, through its size, dimensions, and/or position, to prevent smoke from the solid fuel combustion units from rising directly into the cooking chamber.

The drip tray 108 functions as a heat shield to funnel smoke to a pair of channels adjacent to the sidewalls, 109 and 112, of the smoker to thereby prevent direct heat or smoke produced by the solid fuel combustion units from reaching the cooking chamber. The drip tray 108 can be dimensioned within the smoker such that it is flush with (or proximate to) a front wall and a back wall of the smoker and configured to allow airflow only adjacent to sidewalls, 109 and 112, of the smoker.

Figure 9:
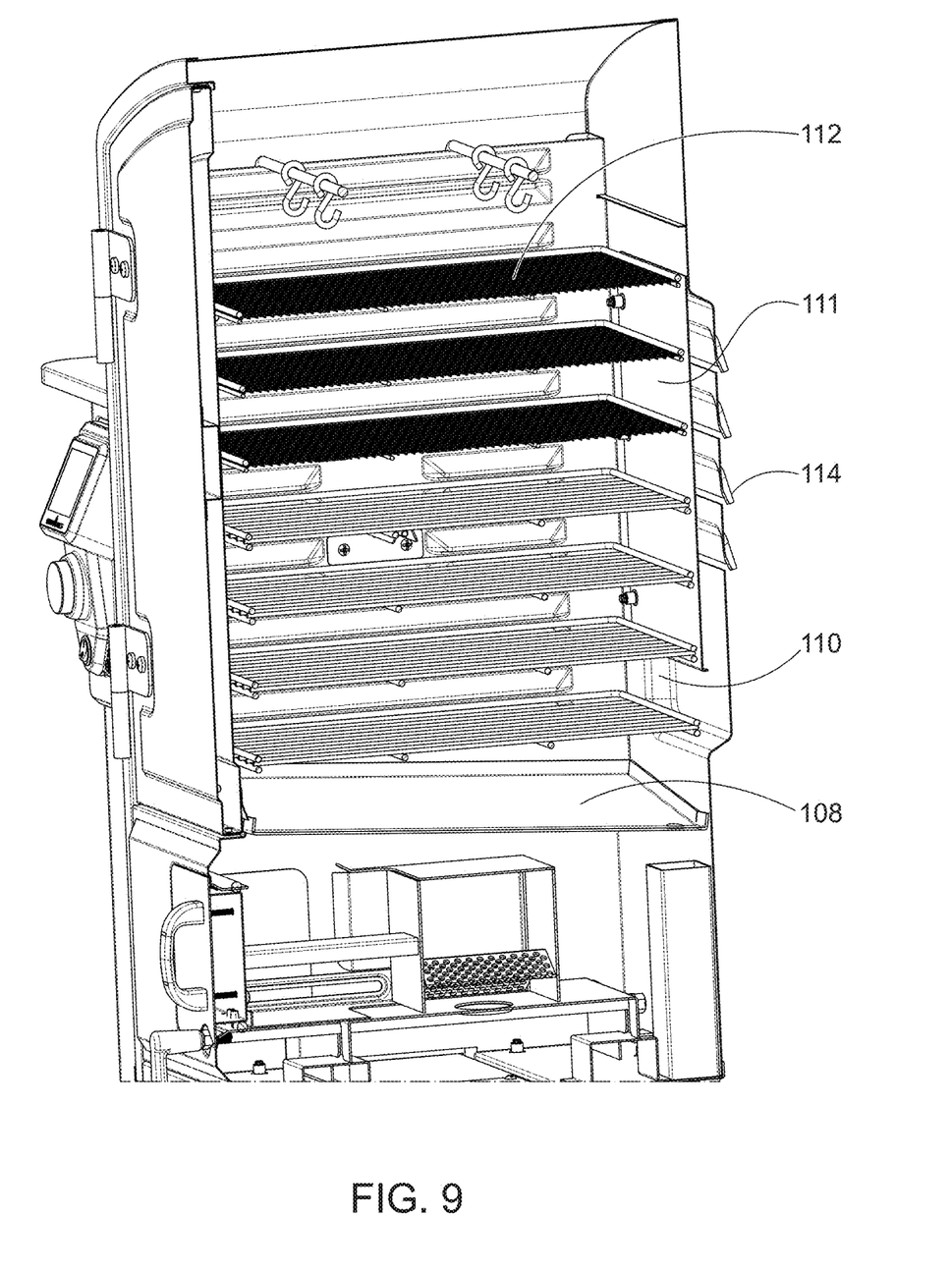
FIG. 9 illustrates a side profile view of the vertical smoker illustrating the various components according to an exemplary embodiment.

Each of the right sidewall 109 and the left sidewall 112 have regions/panels with apertures/holes/openings that allow the smoke and heat to enter the cooking chamber from the gap between the internal cooking chamber walls and the inner walls of the smoker. As shown in FIG. 9, right side wall 109 includes four panels, such as panels 109A and 109B, that have apertures. These apertures allow hot air and smoke from the burner below the cooking chamber to blow into the cooking chamber from different elevations. The apertures within panels can be sized and shaped such that they are configured to create even heat throughout the chamber.

Figure 7:
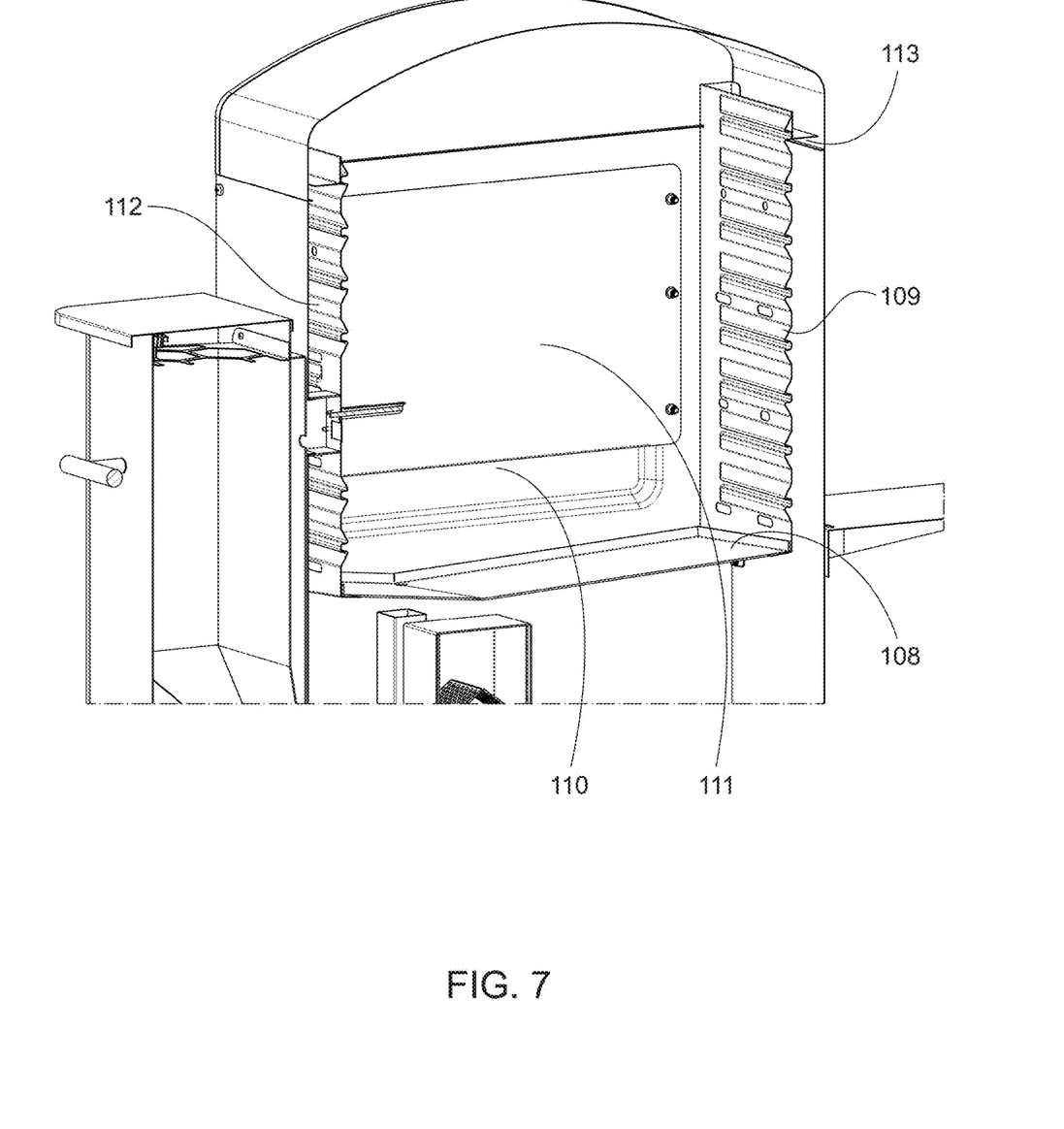

The top portion of each of the right sidewall 109 and the left sidewall 112 can be either fully or partially closed off to seal the gap between the right cooking chamber sidewall 109 and internal right wall of the smoker and left cooking chamber sidewall 112 and the internal left wall of the smoker. This forces more air/smoke/heat through the holes/openings in the panels of the right cooking chamber sidewall 109 and the left cooking chamber sidewall 112. FIG. 7 illustrates the top portion 113 of the right sidewall 109, which seals off the space between the right cooking chamber sidewall 109 and the internal right wall of the smoker.

As shown in FIGS. 6-12, the back of the cooking chamber has a back panel 111 that is removable so that creosote in the exhaust area can be cleaned. Below the back panel 111 is an exhaust 110 for the cooking chamber through which the smoke can exit the smoker. Since the exhaust 110 is located relatively low within the cooking chamber, the smoke has to cool down enough to reach the exhaust 110 before it can escape.

Figure 8:
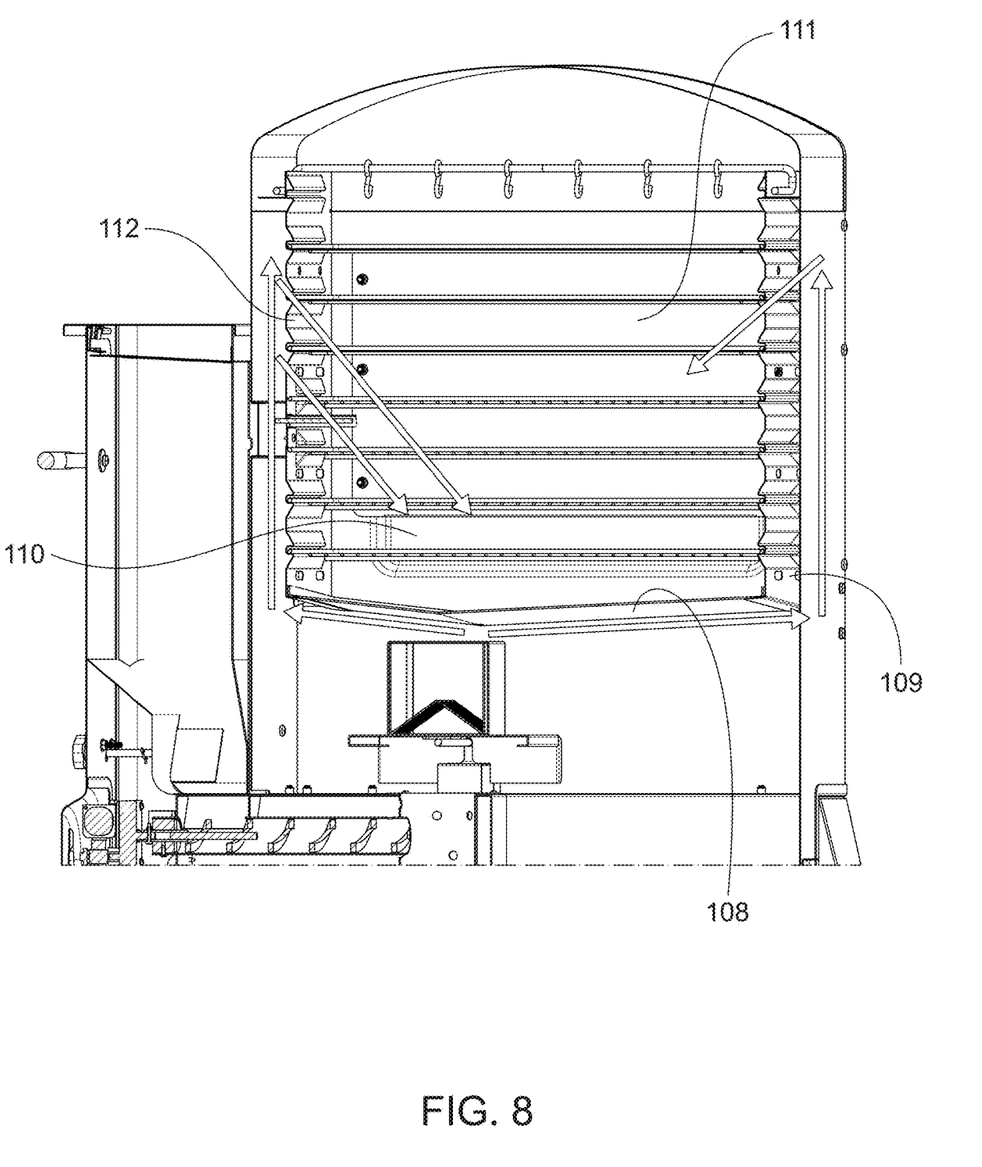
FIG. 8 illustrates the smoke and heat path for the smoke and heat generated by the primary and secondary combustion units of the vertical smoker according to an exemplary embodiment.

FIG. 8 illustrates the smoke and heat path for the smoke and heat generated by the primary and secondary combustion units. The white arrows indicate the smoke and heat path. As shown in the figure, the smoke and heat is deflected by the bottom of the drip tray 108 and then routed to the sides into the gap between cooking chamber left wall 112 and left wall of the smoker and the cooking chamber right wall 109 and right wall of the smoker. The smoke and heat then enters the cooking chamber through the openings in the panels of the cooking chamber left wall 112 and the cooking chamber right wall 109. After entering the cooking chamber, the smoke eventually cools enough to exit the cooking chamber through the exhaust 110 in the back wall of the cooking chamber.

Figure 10:
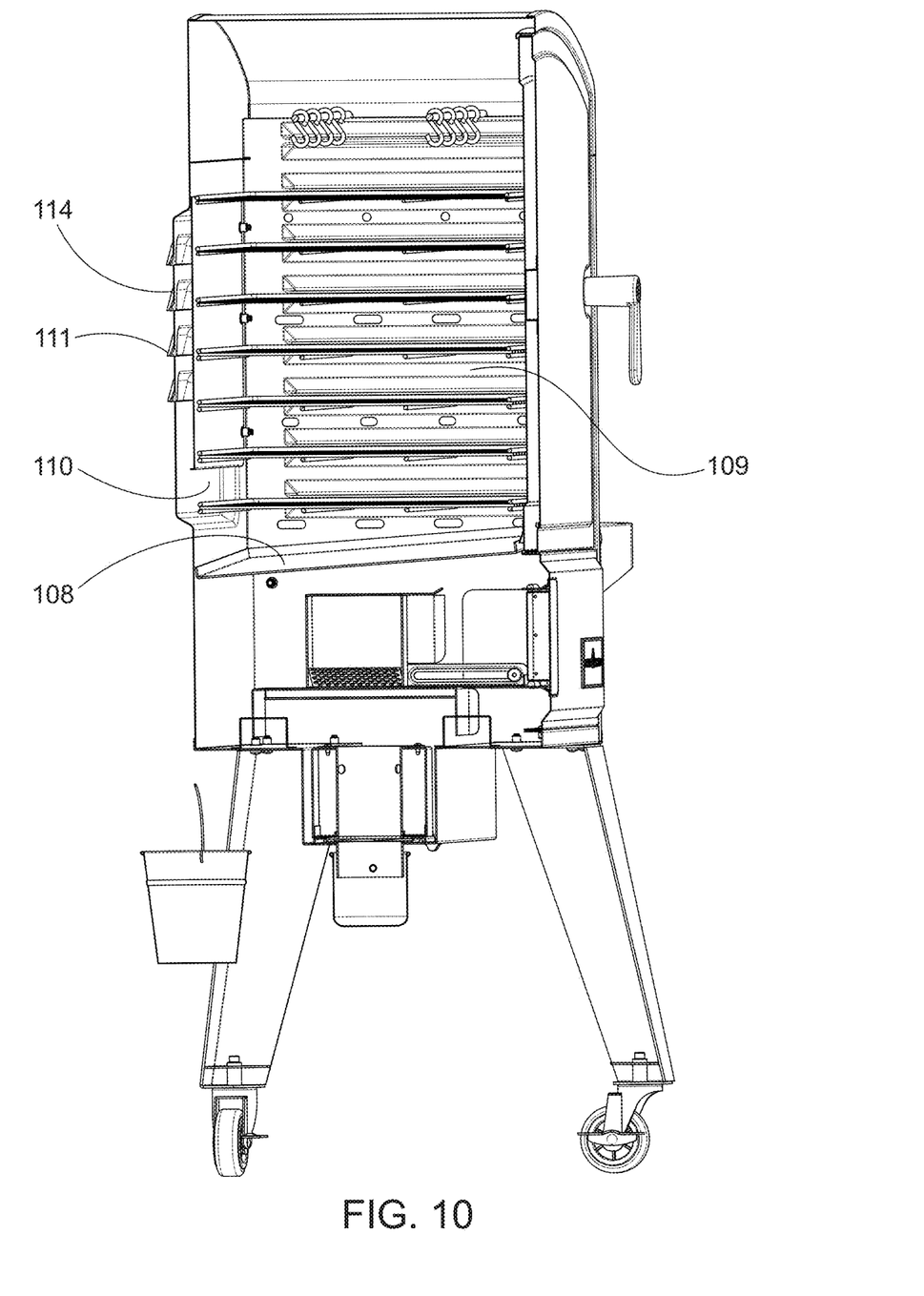
FIGS. 10-11 illustrate additional internal views of the vertical smoker according to an exemplary embodiment.
Figure 11:
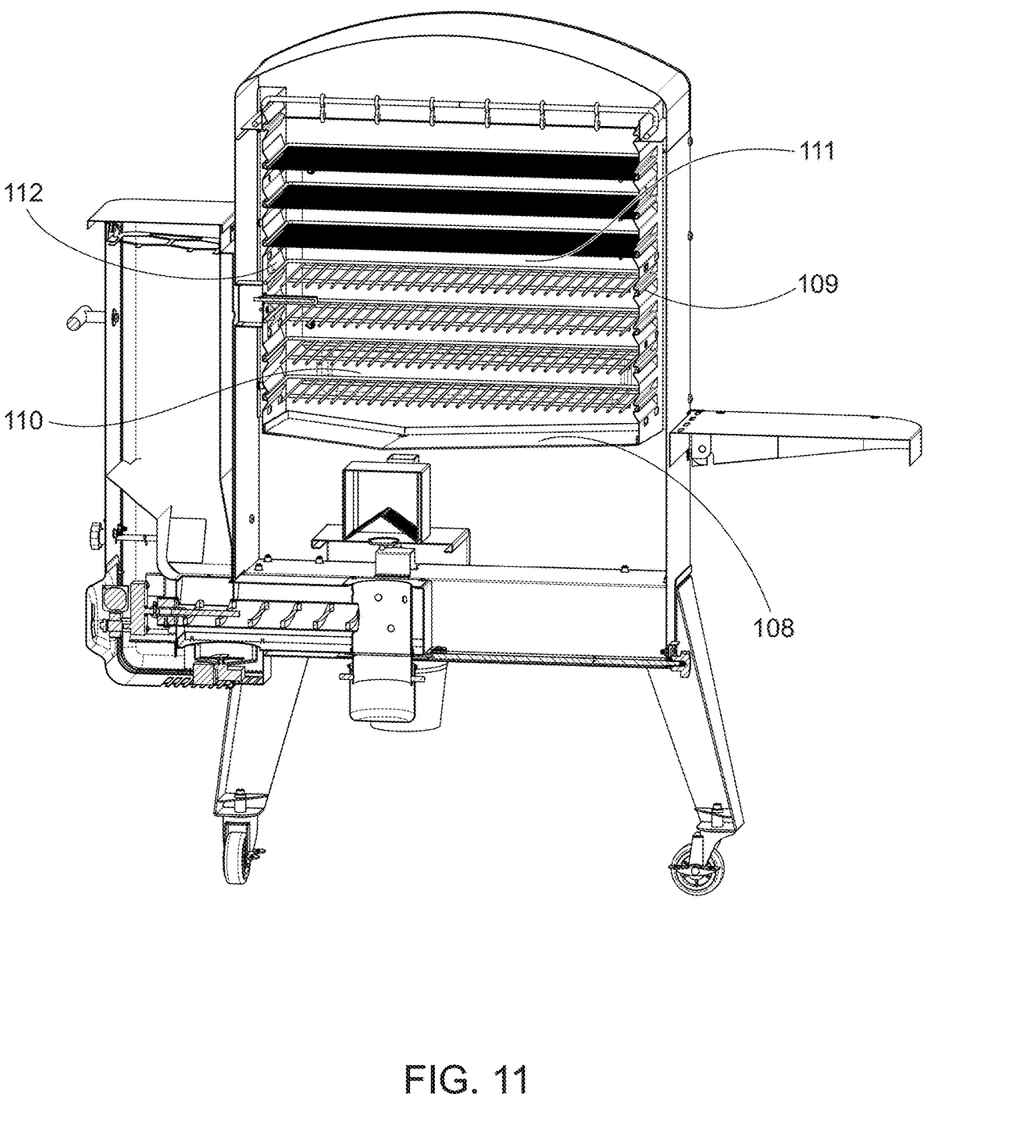

FIG. 9 illustrates a side profile view of the vertical smoker illustrating the various components. As shown in FIG. 9, the back side of the vertical smoker includes exhaust vents 114, through which the smoke exits the vertical smoker after passing through exhaust 110. FIGS. 10-11 illustrate additional views of the vertical smoker.

Figure 12:
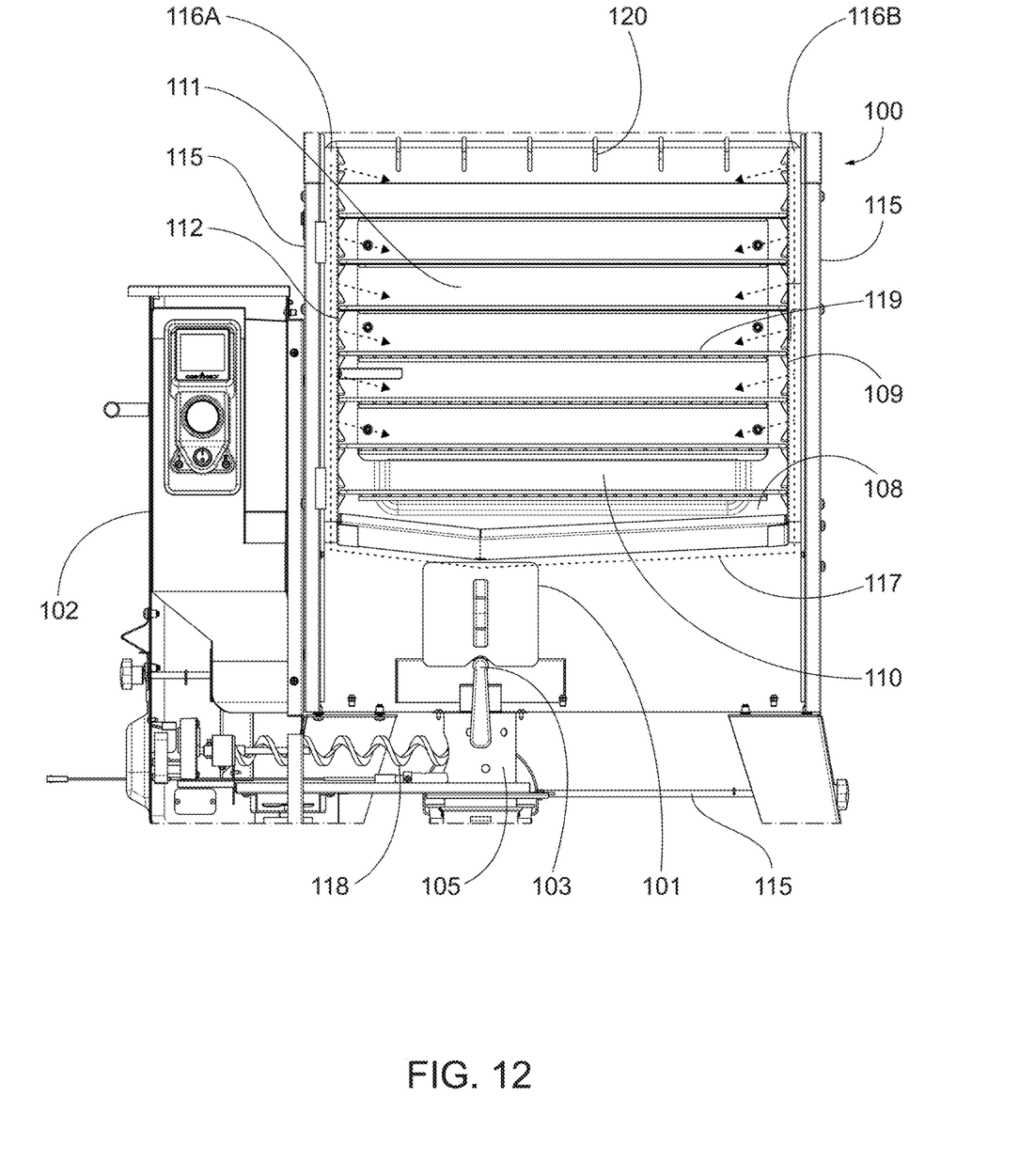
FIG. 12 illustrates an internal view of the vertical smoker 100 with several of the front exterior housing panels removed to show internal components according to an exemplary embodiment.

FIG. 12 illustrates an internal view of the vertical smoker 100 with several of the front exterior housing panels removed to show internal components.

As shown in FIG. 12, the vertical smoker 100 includes an external housing 115 that surrounds the internal components, including the chamber. The external housing 115 is shown in several of the previous figures, such as FIGS. 1 and 6-7. The external housing can take any shape, such as the rectangular and arched form shown in the figures, or another shape, such as a cylindrical form (e.g. a vertically oriented cylinder), a rectangular form (without arches), etc.

The vertical smoker 100 also includes one or more sidewalls at least partially defining a cooking chamber within the external housing. As shown in FIG. 12, the one or more sidewalls include two sidewalls, 112 and 109. The one or more sidewalls at least partially define the cooking chamber, which is contained within the external housing. Although the figure shows two sidewalls, it is understood that the number of sidewalls could be greater or lower. For example, a cylindrically shaped cooking chamber could have a single continuous sidewall that surrounds the cooking chamber. In another example where the cooking chamber has a hexagonal shape, the cooking chamber could have two sidewalls on each side, for a total of four sidewalls. A number of variations are possible and these examples are not intended to be limiting.

The vertical smoker 100 also includes a solid fuel combustion unit 105 configured to combust solid fuel and produce smoke and heat. The vertical smoker 100 is discussed earlier with respect to previous figures. As shown in FIG. 12, the solid fuel combustion unit 105 can be disposed within a lower portion of a volume defined by the external housing 115 and outside of the cooking chamber.

As discussed previously and as shown in FIG. 12, the solid fuel combustion unit can be a wood pellet burner. When the solid fuel combustion unit is a wood pellet burner, the vertical smoker 100 can include a wood pellet hopper 102 configured to store a supply of wood pellets and an auger 118 (including a cylindrical housing not shown) configured to feed wood pellets to the wood pellet burner.

The vertical smoker further includes a drip tray 117 disposed above the solid fuel combustion unit. The drip tray 117 can form a floor of the cooking chamber and can be configured to route the smoke and heat produced by the solid fuel combustion unit into at least one channel disposed between at least one sidewall in the one or more sidewalls and the external housing. In the example shown in FIG. 12, there are two channels, 116A and 116B. Channel 116A is disposed between sidewall 112 and exterior housing 115. Channel 116B is disposed between sidewall 109 and exterior housing 115. The path of smoke and heat as it is deflected by the drip tray 117 into channels 116A and 116B is shown by dashed line/arrows 117.

The drip tray can extend to the one or more sidewalls to thereby seal the bottom of the cooking chamber. As shown in FIG. 12, the drip tray 117 extends to sidewalls 112 and 109. This prevents heat and smoke from rising directly up into the cooking chamber and forces heat and smoke into channels 116A and 116B.

The drip tray can be sloped upwards from a low point above the solid fuel combustion unit to a high point at the one or more sidewalls. The drip tray 117 of FIG. 12 is sloped upwards on both sides such that the area of the drip tray 117 above the solid fuel combustion unit 105 is the lowest point of the drip tray 117 and the ends of the drip tray on both sides are higher (vertically) than the area above the solid fuel combustion unit 105. Although the example of FIG. 12 shows a drip tray with two sloped surfaces, the drip tray can also have a single sloped surface. For example, if the combustion unit 105 is located on one side of smoker, then a drip tray with a single sloped surface can be utilized (along with a vertical wall connecting the other end of the drip tray with a sidewall).

As discussed previously, the vertical smoker additionally includes one or more apertures disposed in at least one sidewall. The one or more apertures are configured to allow the smoke and heat to pass from at least one channel into the cooking chamber. In the example of FIG. 12, a plurality of apertures are disposed in the two sidewalls 112 and 109. Examples of apertures that can be utilized are discussed with respect to FIG. 6. The one or more apertures can include, for example, a circular aperture, an oval aperture, a rectangular aperture, a triangular aperture, and/or a slit. The apertures can be disposed in an upper half of at least one sidewall. This routes the smoke and heat to a higher point within the vertical smoker prior to entering the cooking chamber.

The vertical smoker additionally includes a back panel 111 that at least partially forms a back wall of the cooking chamber. The back panel is discussed with respect to previous figures, and as shown in FIG. 12, can include multiple sub-panels adjacent to and/or coupled to each other and/or to the external housing 115.

An exhaust opening 110 is disposed within the cooking chamber below the back panel 111. The exhaust opening 110 is configured to allow smoke to exit from the cooking chamber and out of the external housing 115. As discussed previously, as smoke cools, it moves lower in the cooking chamber and eventually exits out of the exhaust opening 110.

As shown in FIG. 12, the cooking chamber can include one or more cooking racks/grates, such as cooking rack 119. The cooking chamber can also include one or more cooking hooks, such as cooking hook 120.

The vertical smoker can include a secondary solid fuel combustion unit 101 removably inserted into the cooking device below the cooking chamber and configured to combust a second solid fuel and provide a second source of smoke and heat. The secondary solid fuel combustion unit can be removably inserted into a receiving aperture integrated into the cooking device and configured to receive the secondary solid fuel combustion unit.

The receiving aperture can be located above the solid fuel combustion unit such that the secondary solid fuel combustion unit 101 is located above the solid fuel combustion unit 105 when the secondary solid fuel combustion unit 101 is inserted into the receiving aperture.

The vertical smoker can additionally include a butterfly valve disposed above the solid fuel combustion unit 105 and below the secondary solid fuel combustion unit 101, the butterfly valve being actuated by a handle 103 on the external housing. The operation of the butterfly valve 104 is described in greater detail with respect to FIG. 5. The solid fuel combustion unit 105 includes a burner configured to combust the solid fuel in the solid fuel combustion unit. The burner of the solid fuel combustion unit can be further configured to combust the second solid fuel in the secondary solid fuel combustion unit 101 when the butterfly valve 105 is in the open position.

Referring to FIG. 5, the vertical smoker can include a housing 107 configured to receive the secondary solid fuel combustion unit 101, the housing 107 includes a ceiling configured to seal the secondary solid fuel combustion unit 101 when the secondary solid fuel combustion unit 101 is completely inserted into the receiving aperture.

Having described and illustrated the principles of our invention with reference to the described embodiments, it will be recognized that the described embodiments can be modified in arrangement and detail without departing from such principles.

It will be appreciated by those skilled in the art that changes could be made to the embodiments described above without departing from the broad inventive concept thereof. For example, the components of the above-described devices could be rearranged or occur in a different series, as understood by those skilled in the art. It is understood, therefore, that this disclosure is not limited to the particular embodiments disclosed, but it is intended to cover modifications within the spirit and scope of the following claims.

The invention claimed is:

1. A smoker, comprising:
   an external housing;
   one or more sidewalls at least partially defining a cooking chamber within the external housing;
   a solid fuel combustion unit configured to combust solid fuel and produce smoke and heat;
   a drip tray disposed above the solid fuel combustion unit and forming a floor of the cooking chamber, the drip tray being configured to route the smoke and heat into at least one channel disposed between at least one sidewall in the one or more sidewalls and the external housing;
   one or more apertures disposed in the at least one sidewall, the one or more apertures being configured to allow the smoke and heat to pass from the at least one channel into the cooking chamber;
   a secondary solid fuel combustion unit removably inserted into a receiving aperture below the cooking chamber and configured to combust a second solid fuel and provide a second source of smoke and heat; and
   a butterfly valve disposed above the solid fuel combustion unit and below the secondary solid fuel combustion unit, the butterfly valve being actuated by an actuator on the external housing.

2. The smoker of claim 1, further comprising:
   a back panel at least partially forming a back wall of the cooking chamber;
   an exhaust opening disposed within the cooking chamber below the back panel, the exhaust opening being configured to allow smoke to exit from the cooking chamber and out of the external housing.

3. The smoker of claim 1, wherein the one or more sidewalls comprise two sidewalls, wherein the at least one channel comprises two channels disposed between the two sidewalls and the external housing, and wherein the one or more apertures comprise a plurality of apertures disposed in the two sidewalls.

4. The smoker of claim 1, wherein solid fuel combustion unit comprises a wood pellet burner, the smoker further comprising:
   a wood pellet hopper configured to store a supply of wood pellets;
   an auger configured to feed wood pellets to the wood pellet burner.

5. The smoker of claim 1, wherein the drip tray extends to the one or more sidewalls to thereby seal the bottom of the cooking chamber.

6. The smoker of claim 1, wherein the drip tray is sloped upwards from a low point above the solid fuel combustion unit to a high point at the one or more sidewalls.

7. The smoker of claim 1, wherein one or more apertures comprise one or more of: a circular aperture, an oval aperture, a rectangular aperture, a triangular aperture, or a slit.

8. The smoker of claim 1, wherein the one or more apertures are disposed in an upper half of the at least one sidewall.

9. The smoker of claim 1, wherein the cooking chamber comprises one or more cooking racks.

10. The smoker of claim 1, wherein the cooking chamber comprises one or more cooking hooks.

11. The smoker of claim 1, wherein the solid fuel combustion unit is disposed within a lower portion of a volume defined by the external housing and outside of the cooking chamber.

12. The smoker of claim 1, wherein the actuator comprises a handle.

13. The smoker of claim 12, wherein the solid fuel combustion unit comprises a burner configured to combust the solid fuel and wherein the burner is further configured to combust the second solid fuel in the secondary solid fuel combustion unit when the butterfly valve is in the open position.

14. The smoker of claim 1, further comprising:
   a housing configured to receive the secondary solid fuel combustion unit, the housing comprising a ceiling configured to seal the secondary solid fuel combustion unit when the secondary solid fuel combustion unit is completely inserted into the receiving aperture.

15. A smoker, comprising:
   an external housing;
   one or more sidewalls at least partially defining a cooking chamber within the external housing;
   a solid fuel combustion unit comprising a burner configured to combust solid fuel and produce smoke and heat;
   a drip tray disposed above the solid fuel combustion unit and forming a floor of the cooking chamber, the drip tray being configured to route the smoke and heat into at least one channel disposed between at least one sidewall in the one or more sidewalls and the external housing;
   one or more apertures disposed in the at least one sidewall, the one or more apertures being configured to allow the smoke and heat to pass from the at least one channel into the cooking chamber;

a secondary solid fuel combustion unit removably inserted into the smoker below the cooking chamber and configured to store a second solid fuel; and a valve disposed between the solid fuel combustion unit and the secondary solid fuel combustion unit, wherein the burner is configured to combust the second solid fuel when the valve is in an open position and thereby provide a second source of smoke and heat.

16. The smoker of claim 15, wherein the valve comprises a butterfly valve a butterfly valve disposed above the solid fuel combustion unit and below the secondary solid fuel combustion unit, the butterfly valve being actuated by a handle on the external housing.

17. The smoker of claim 16, further comprising:

an actuator on the external housing configured to actuate the valve between a closed position and the open position.

18. The smoker of claim 15, further comprising:

a back panel at least partially forming a back wall of the cooking chamber; and an exhaust opening disposed within the cooking chamber below the back panel, the exhaust opening being configured to allow smoke to exit from the cooking chamber and out of the external housing.

19. A smoker, comprising:

an external housing;

one or more sidewalls at least partially defining a cooking chamber within the external housing;

a solid fuel combustion unit configured to combust solid fuel and produce smoke and heat;

a drip tray disposed above the solid fuel combustion unit and forming a floor of the cooking chamber, the drip tray being configured to route the smoke and heat into at least one channel disposed between at least one sidewall in the one or more sidewalls and the external housing;

one or more apertures disposed in the at least one sidewall, the one or more apertures being configured to allow the smoke and heat to pass from the at least one channel into the cooking chamber;

a secondary solid fuel combustion unit below the cooking chamber and configured to combust a second solid fuel and provide a second source of smoke and heat;

a butterfly valve disposed above the solid fuel combustion unit and below the secondary solid fuel combustion unit, the butterfly valve being actuated by a handle on the external housing, wherein the secondary solid fuel combustion unit is configured to combust the second solid fuel when the butterfly valve is in the open position;

a back panel at least partially forming a back wall of the cooking chamber; and an exhaust opening disposed within the cooking chamber below the back panel, the exhaust opening being configured to allow smoke to exit from the cooking chamber and out of the external housing.

* * * * *